Aug. 12, 1969  C. T. HOOVER  3,460,706

DOUBLE-WALLED CONTAINER

Filed July 19, 1967

INVENTOR.
Charles T. Hoover
BY
Paul Fitzpatrick
ATTORNEY

United States Patent Office 3,460,706
Patented Aug. 12, 1969

3,460,706
DOUBLE-WALLED CONTAINER
Charles T. Hoover, Indianapolis, Ind., assignor to General Motors Corporation, Detroit, Mich., a corporation of Delaware
Filed July 19, 1967, Ser. No. 654,608
Int. Cl. B65d 25/02
U.S. Cl. 220—15                                   6 Claims

ABSTRACT OF THE DISCLOSURE

A container comprising an outer casing, an inner casing, and means to support the inner casing from the outer casing or an internal body and to minimize heat transfer through the support. There are at least two supports for the inner casing, each comprising a drum, a hub within the drum, and rows of spokes in tension between the hub and drum.

---

My invention relates to containers for fluids which are to be kept hot or cold relative to the environment and in which it is desirable to minimize heat transfer through the walls of the container.

It is common practice to employ double-walled containers with means to minimize heat transfer between the walls which may include insulation, heat reflecting surfaces, and evacuated spaces between the case. Whatever the means for minimizing heat loss may be, there remains the problem of supporting the inner casing from or within the outer, and often there is substantial heat transfer through the supports. My invention is directed to an improved arrangement for supporting the inner container which is such as to provide substantial mechanical strength but provide a minimum cross section for transfer of heat.

The nature of my invention and the advantages thereof will be apparent to those skilled in the art from the succeeding detailed description of the preferred embodiment of the invention and the accompanying drawings thereof.

Figure 1:
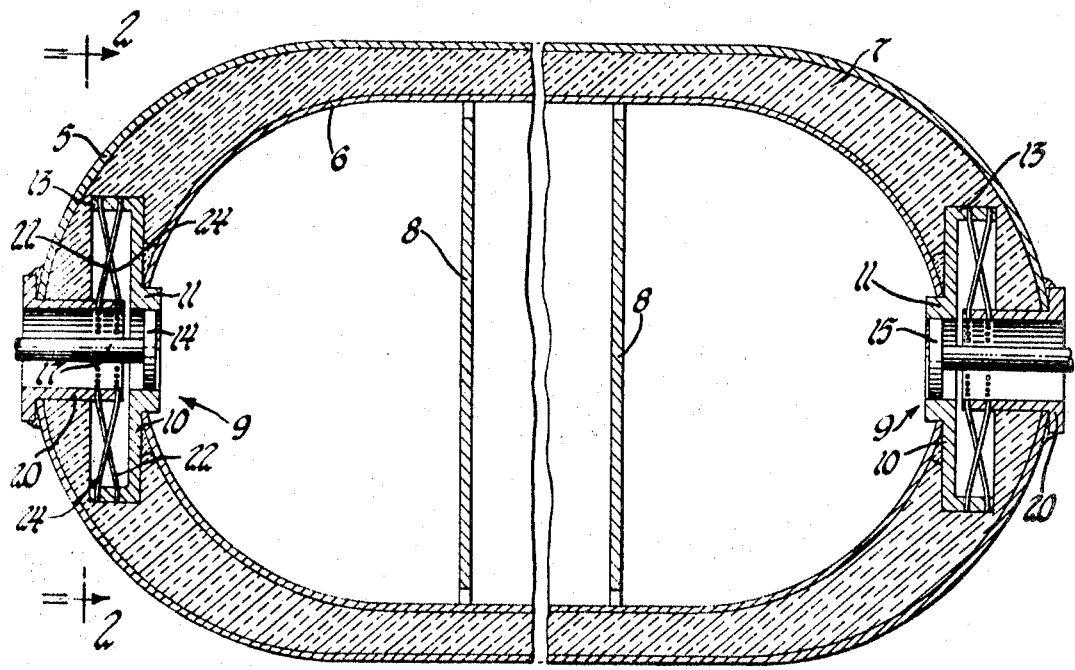
FIGURE 1 is an axial sectional view of a heat-insulated container.
Figure 2:
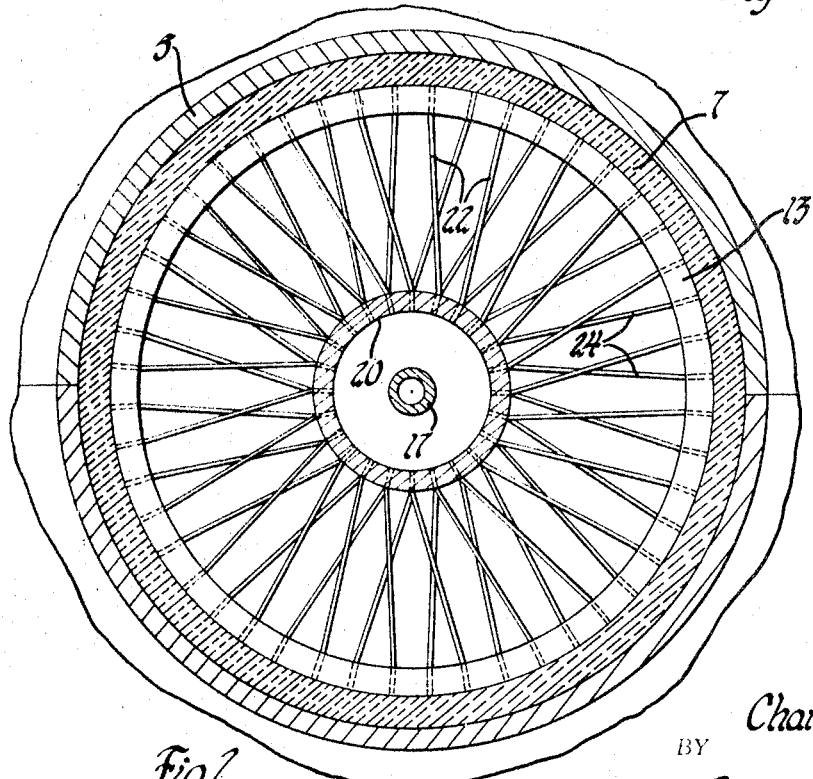
FIGURE 2 is a fragmentary sectional view taken on the plane indicated by the line 2—2 in FIGURE 1.

Referring to the drawings, a container comprises an outer casing 5, an inner casing 6, and thermal insulation 7 filling the space between the casings. The inner casing may be fitted with swash plates 8 and any other desired fittings or reinforcements. As illustrated, the containers are of cylindrical form with hemispherical ends, although there is no specific shape which is relevant to my invention. With the generally cylindrical casings, there are preferably two support means 9, one at each end of the casings. To provide the support means, the inner casing 6 has an opening at each end within which is welded an annular fitting 10 including an inner flange 11 filling the opening in the end of the casing and an outer flange or drum 13 projecting axially of the inner casing 6. The inside of flange 11 is closed by a removable plug 14 or 15 and a fill and empty pipe 17 connects to the interior of casing 6 through the plug 14. A cylindrical flanged fitting or hub 20 is welded to the outer casing 5 in alignment with each fitting 10 and projecting inside the drum 13. Line 17 extends through one of the fittings 20.

The inner casing is supported from the outer casing by two rows of long thin spokes in tension, each row of spokes being disposed between one of the drums 13 and the corresponding hub 20. These spokes are so disposed as to resist forces both radial and axial with respect to the axis of the casings and the hub and drum. This is accomplished by having the spokes disposed at an angle to a radius from the axis of the hub both in the circumferential and the axial directions. As illustrated, each support comprises a first set of spokes 22 which incline counterclockwise from the hub to the drum and also incline inwardly toward the center of the container from the hub to the drum, and a second set of spokes 24 which incline axially and circumferentially in the opposite direction. Since these spokes provide the support by tension only, being too thin to have any significant strength as a beam or column, they may be of very small cross section and are made as long as convenient for the dimensions of the container so that the spokes provide a very small effective total cross-sectional area and a long path for flow of heat from the fitting 10 to the fitting 20; or, in other words, from the inner casing 6 to the outer casing 5. These spokes may be made of a metal having relatively low heat conductivity in relation to strength, such as stainless steel, for example. With the structure illustrated, two supports, one at each end of the container, are quite adequate. In this case, the spokes in each support 9 may all be inclined the same as viewed in FIGURE 1, the two supports pulling against each other. With containers of other configurations, various dispositions of various numbers of the supports may be made, but preferably each support is of the type illustrated. Obviously, the support means is usable with double-walled containers having other modes of insulation such as those in which the insulation is provided by heat- reflecting surfaces on the casings and an evacuated space between them.

In many, if not most cases, the entire container may be mounted on external mounts entering the hubs 20. In this case, hubs 20 support both casings, the inner casing 6 through the insulating spokes and outer casing 5 directly.

The preferred mode of assembly of this structure is as follows: The fittings 10 and 20 are provided with the spokes 22 and 24 which are put in tension and brazed, welded, or otherwise to the fittings so as to remain under slight tension at no load. This operation is analogous to the manufacture of wire wheels for vehicles. The assembled support 9 is then welded to the end of the inner casing 6. The outer casing, which may be in two halves split longitudinally, is then fitted around the supports and welded to them. Other means of holding the parts together may, of course, be employed.

The nature and advantages of my invention should be clear to those skilled in the art from the foregoing and it will be apparent that many modifications may be made by the exercise of skill in the art without departing from the invention, which is not to be considered as limited by the detailed description of the preferred embodiment thereof.

I claim:

1. A heat-insulated container comprising, in combination, an outer casing, a closed inner casing contained within and spaced from the outer casing, and at least two support means supporting the inner casing within the outer casing and relatively locating the casings, each said support means comprising a hub fixed to one casing, a drum fixed to the other casing substantially coaxial with the hub, and a plurality of circumferentially disposed rows of thin spokes extending between and maintained in tension between the hub and drum so as to support the inner casing solely by tension in the spokes, the spokes of each support means being inclined from planes normal to the axis of the hub and drum in both directions along the axis and in both directions around the axis to provide opposed tension forces both along and around the axis, the spokes being longer than necessary to provide a support so as to minimize heat conduction through the spokes.

2. A combination as recited in claim 1 comprising two coaxial support means providing the entire support for the inner casing.

3. A combination as recited in claim 1 in which the hubs are fixed to the outer casing.

4. A combination as recited in claim 1 in which the support means provides for support of both casings from external supports.

5. A combination as recited in claim 1 in which the spokes are of a metal of relatively high ratio of yield strength to heat conductivity.

6. A combination as recited in claim 1 in which the direction of each spoke is predominantly radial relative to the axis of the hub and drum.

References Cited

UNITED STATES PATENTS

| 883,479 | 3/1908 | Place | 220—15 |
| 2,858,136 | 10/1958 | Rind | 220—15 X |
| 3,078,004 | 2/1963 | Randolph | 220—15 X |
| 3,080,086 | 3/1963 | James | 220—15 |
| 3,355,051 | 11/1967 | Kloeckner et al. | 220—15 |

JOSEPH R. LECLAIR, Primary Examiner

JAMES R. GARRETT, Assistant Examiner